Dec. 3, 1929.    G. J. QUALMAN    1,738,204
FISHING REEL
Filed July 16, 1927
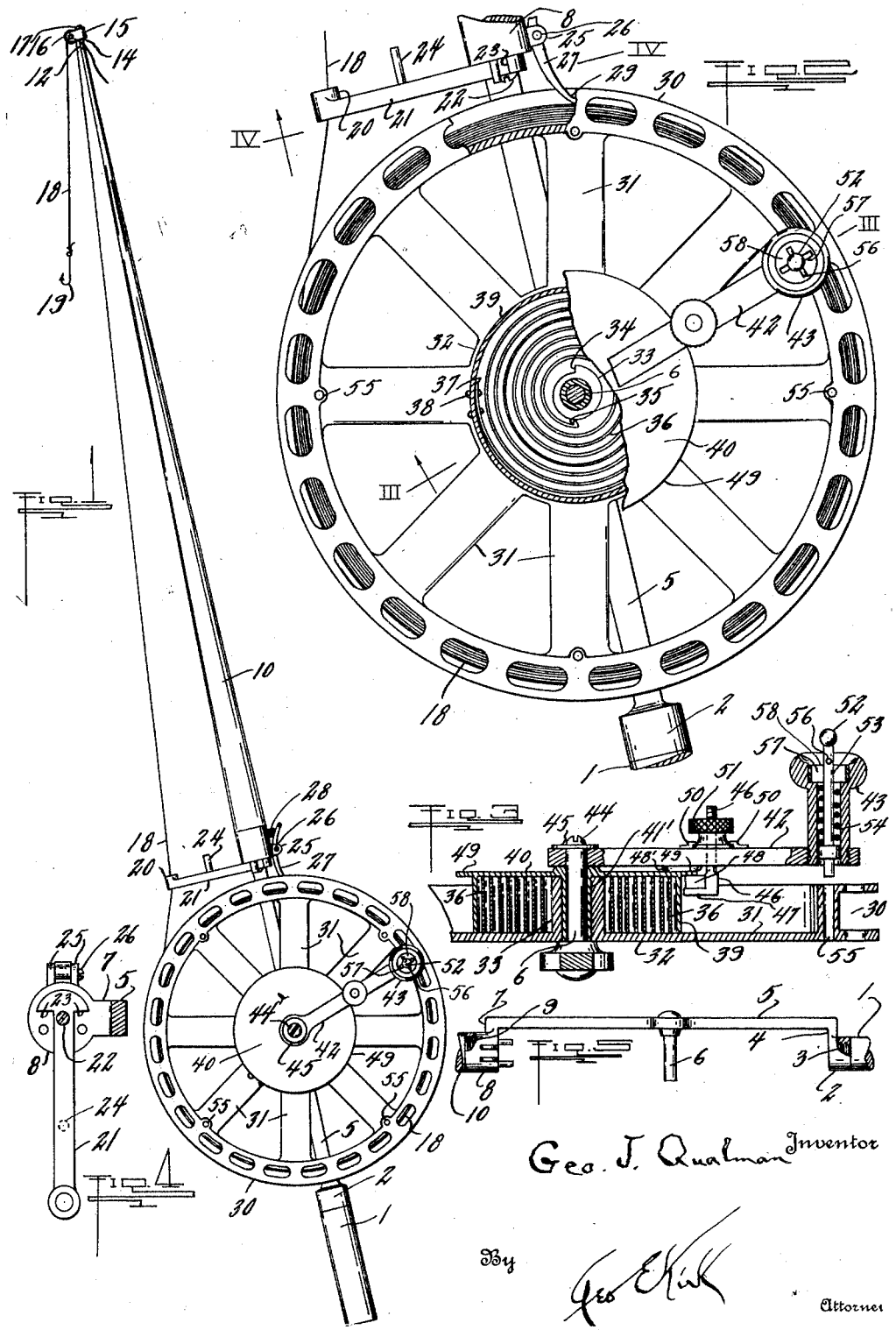

Patented Dec. 3, 1929

1,738,204

UNITED STATES PATENT OFFICE

GEORGE J. QUALMAN, OF TOLEDO, OHIO

FISHING REEL

Application filed July 16, 1927. Serial No. 206,173.

This invention relates to retrieving and controlling of lines.

This invention has utility when incorporated in angling equipment more especially as a reel for large game fish.

Referring to the drawings:

Fig. 1 is a view of an embodiment of the invention in a reel provided for the fish pole;

Fig. 2 is a reel on an enlarged scale from the showing in Fig. 1;

Fig. 3 is a section on the line III—III, Fig. 2, looking in the direction of the arrow;

Fig. 4 is a section on the line IV—IV, Fig. 2, looking in the direction of the arrow; and Fig. 5 is a detail view of the bracket with the reel removed therefrom.

Line pole section 1 is provided with bracket 2 having screw threads 3 as a connection therebetween. This bracket 2 has offset portion 4 with bar 5 extending in line with the pole portion 1, but laterally thereof. This portion 5, intermediate its extent, is provided with stem 6. This portion 5 remote from the portion 4 has inwardly offset portion 7 terminating in sleeve 8 having threaded connection 9 with main pole portion 10. This main pole portion 10, as upwardly extending, terminates in reduced diameter portion 11 having shouldered sleeve 12 provided at its outer portion with bearing 14 upon which is mounted sleeve 15 carrying pulley 16 retained by head 17 in assembly with the sleeve 12.

One way from this pulley 16, line 18 extends to carry hook 19. Oppositely from this pulley 16, the line 18 extends through guide 20 of traverse controlling lever 21 having mounting screw 22 as a fulcrum and shoulders 23 limiting the rocking of the lever 21, which rocking may be controlled by upwardly extending pin 24.

The sleeve 8 carries the lever 21. The sleeve 8 is provided with a pair of ears 25 in which is mounted fulcrum pin 26 for retarder 27. This retarder 27 is normally rocked by compression spring 28 into position to have flexible terminus 29 of the retarder engage against wraps of the line 18 in channel 30 of wheel or reel. This reel has spokes 31 from central web portion 32.

Axially this reel is provided with sleeve or bearing 33 loosely mounted about the pin 6. This sleeve 33 is provided with hook seat 34 with which may engage inner hook terminus 35 of spiral spring 36 in the wrappings of such spiral around this sleeve 33. The outer terminus 37 of this helical spring 36 has rivet connection 38 with drum 39 overhanging from web 40 of inner sleeve 41' loosely mounted on the stem 6. Outside of the inner sleeve 41' is the sleeve 33. There is accordingly a complete housing for this spiral spring 36 in the drum 39. The stem 6 extends beyond this web 40 and provides a bearing for crank arm 42 terminating in handle 43. This crank arm 42 is retained in assembly with the stem 6 by screw 44 coacting with washer 45. This crank 42 intermediate its length is provided with non-rotary screw 46 having offset head 47 carrying friction pad 48 for coacting with annular radial flange 49 protruding from the drum 39 in the plane of the drum web 40.

Retainer clips 50 on the crank arm 42 provide swivel connection for nut 51 on the bolt 46 thereby permitting adjustment of this friction shoe 48 as to the endless annular flange 49 of the drum 39. This means that in using the crank 43 to wind the spring motor 36, the connection may be friction adjusted by the engagement of the flange 49 between the shoe 48 and pad 48' carried by the arm 47.

In practice, the reel channel 30 herein may carry from two to five thousand feet of fine wire. In fishing, in the event a fish engages the hook 19 and pulls vigorously upon it, the reel 30 may permit pulling out of the line 18 to a very considerable extent. However, at all times it may be effected by the operator holding the handle 43 at resistance as effected by the screw 46 with an additional holding connection due to the spring motor 36. This spring motor 36 is also effective to the end that any quick reverse movement of the fish will maintain the tension on the line 18 to take up any slack, thereby precluding any fish movement which might tend to slack the line. The fish is thus at no time in position to throw the hook from its mouth. Even should the fish jump clear of the water, in such position the fish is without holding means and the pull on the line would draw the fish toward the pole.

This retrieving constant for the reel holds the line against any kinking. In practice, the reel may be twelve or fourteen inches in diameter at the channel 30 and accordingly there is considerable leverage for the operator in direct pulling on the line at any desired adjusted friction for hauling in with the wraps of the line such that the line is not weakened by any sharp bends therein. It is accordingly seen by this disclosure that there is possible from handle gripping by the operator a maintenance of retrieving as well as yieldable connection at all times on the line 18 and that as the spring motor becomes effective in holding of the fish, the operator may re-wind such spring motor to assure continuance of the retrieving operation.

The device of the disclosure is simple in its form and of a character which may not be readily gotten out of order even by careless winding of the motor and releasing for at any time the reel is free to slip back. Such over-winding of the spring is cared for due to the hook connections 34, 35, permitting no over-winding.

In the event it is desired to have direct control of the line 18 from the handle 43, head 52 on stem 53 may be turned in the handle 43 to permit spring 54 to thrust the stem 53 into a seat 55 in the reel 31 adjacent the channel 30. At this position of the stem 53, cross pin 56 enters slot 57. As so positively connected the crank 42 may be operated for direct control of the line 18. This permits a definite pull for freeing the line from a snag independently of straining the spring 36. Furthermore, the line may be paid out positively. Pulling the head 52 to retract the stem 53, unclutches the arm 42 from this positive connection and as so disconnected, the cross pin 56 may ride on ledge 58 and thus be held out of the slot 57.

What is claimed and it is desired to secure by Letters Patent is:

1. A line pole having intermediate its length an offset bracket providing a bearing, a reel carried by said bearing in the plane of the pole, a crank, a friction shoe connection between the crank and reel, and shoe gripping adjusting means for determining different degrees of frictional holding action of the crank through said connection.

2. A line pole, a line therefor, a bracket mounted on the pole and provided with a fixed hub, a reel rotatably mounted on said hub fixed as a bearing and to which reel the line extends, a crank for operating the reel, a spring motor connection between the crank and reel and assembled with the reel loosely on said hub, a screw assembling the crank with the hub for maintaining the reel and motor mounted on the hub, and an additional connection between the crank and reel for effecting winding action of the crank for the reel.

3. A line pole, a reel therefor, a line from and having a wrap region about the reel, and a controllable flexible retarder for the line pivotally mounted on the pole spaced from the reel and extending to coact with the wrap region of the line about the reel.

4. A line pole, a rotatable reel, a mounting for the reel on an axis transversely of the axis of the pole, a line from the reel, a traverse guide for the line, and a controllable retarder for directly acting on the line, said guide and retarder each being mounted on the pole in proximity to each other and spaced longitudinally of the pole from said reel, the same pole gripping hand of the operator to be effective for controlling each.

5. A line pole, a line therefor, a reel carried by the pole to which the line extends, a crank for operating the reel, and a spring motor connection between the crank and reel including a friction clutch, and adjusting means for the clutch for varying the tension to be placed on the line during relative winding action between the clutch and reel, and an additional controllable positive connection between the crank and reel.

6. A line pole, a line therefor, a reel carried by the pole providing a channel having its web extending parallel to the axis of the reel, a spiral spring connectible to the reel in the plane of said web, a housing drum having fixed connection to the spring and having clearance radially as to said web, said drum having an annular friction region, a crank coaxial with the reel, a friction shoe for engaging the friction region of the drum, and adjustable means for varying the holding action of said shoe.

7. A line pole, a line therefor, a reel carried by the pole providing a channel having its web extending parallel to the axis of the reel, a spiral spring connectible to the reel in the plane of said web, a housing drum having fixed connection to the spring and having clearance radially as to said web, said drum having an annular friction flange, a crank coaxial with the reel, an axially shiftable friction shoe carried by the crank for engaging the friction flange of the drum, and adjustable means for varying the holding action of said shoe.

8. A line pole, a line therefor, a reel for the line, a crank rotatable relatively to the reel, a spring motor connected to the reel, adjustable means for varying the tension to be placed on the line during relative winding action between the crank and motor and coacting as a yieldable connection with the line, and an additional connection between the crank and reel for rendering the spring motor inoperative.

9. A line pole, a line therefor, a reel carried by the line and to which the line extends, a mounting for the reel, a spring motor having connection between the mounting and reel, a crank rotatively mounted as to the reel for introducing resistance in the mounting in rendering said spring motor effective, and a controllable connection between the crank and reel for positively winding the reel.

In witness whereof I affix my signature.

GEORGE J. QUALMAN.